(12) United States Patent
Weder et al.

(10) Patent No.: US 11,960,956 B2
(45) Date of Patent: Apr. 16, 2024

(54) METHOD AND ASSEMBLY FOR WRITING SOFTWARE AND/OR FIRMWARE ONTO A PROGRAMMABLE INTEGRATED CIRCUIT (71) Applicants: GERA-IDENT GMBH, Gera (DE); FRAUNHOFER-GESELLSCHAFT ZUR FÖRDERUNG DER ANGEWANDTEN FORSCHUNG E.V., Munich (DE)

(72) Inventors: Andreas Weder, Dresden (DE); Andreas Heinig, Dresden (DE); Peter Steinbach, Gera (DE); Sören Göhler, Zeitz (DE); Ramin Hassan, Gera (DE)

(73) Assignees: GERA-IDENT GMBH, Gera (DE); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 115 days.

(21) Appl. No.: 17/618,099

(22) PCT Filed: Jun. 25, 2020

(86) PCT No.: PCT/EP2020/067840
§ 371 (c)(1),
(2) Date: Dec. 10, 2021

(87) PCT Pub. No.: WO2020/260467
PCT Pub. Date: Dec. 30, 2020

(65) Prior Publication Data
US 2022/0326926 A1 Oct. 13, 2022

(30) Foreign Application Priority Data

Jun. 26, 2019 (DE) .......................... 102019117235.7
Feb. 5, 2020 (DE) .......................... 102020102918.7
Apr. 30, 2020 (DE) .......................... 102020111854.6

(51) Int. Cl.
*G06K 7/10* (2006.01)
(52) U.S. Cl.
CPC ................. *G06K 7/10297* (2013.01)
(58) Field of Classification Search
CPC .................................. G06K 7/10297
See application file for complete search history.

(56) References Cited

U.S. PATENT DOCUMENTS 9,697,387 B1 * 7/2017 Bowman ............ G06K 7/10009
10,810,480 B2 * 10/2020 Chen .................. G06K 19/0772
(Continued)

OTHER PUBLICATIONS

The Notification Concerning Transmittal of International Preliminary Report on Patentability (Chapter I of the Patent Cooperation Treaty), in English, dated Jan. 6, 2022, which was issued by the International Bureau of WIPO in Applicant's corresponding international PCT application having Serial No. PCT/EP2020/067840, filed on Jun. 25, 2020.
(Continued)

*Primary Examiner* — Mohamed Barakat
(74) *Attorney, Agent, or Firm* — Bodner & Bodner, PLLC; Gerald T. Bodner; Christian P. Bodner (57) ABSTRACT

The invention relates to a method and to an assembly for writing software and/or firmware onto at least one programmable integrated circuit. According to the invention, the software and/or firmware is written wirelessly by means of RFID data transmission, the at least one programmable integrated circuit being coupled to an RFID front end by means of a wired near-field interface, the RFID front end having an RFID antenna device, and the software and/or firmware to be written being sent wirelessly from an external RFID unit to the RFID antenna device and being written
(Continued)

onto the programmable integrated circuit by means of the RFID front end and the near-field interface.

16 Claims, 7 Drawing Sheets

(56) References Cited

U.S. PATENT DOCUMENTS

| | | | | |
|---|---|---|---|---|
| 2008/0030324 | A1* | 2/2008 | Bekritsky | H04Q 9/00 340/539.22 |
| 2008/0041930 | A1* | 2/2008 | Smith | G06F 9/44505 340/572.1 |
| 2008/0303639 | A1 | 12/2008 | Ford et al. | 340/10.51 |
| 2009/0033493 | A1* | 2/2009 | Lin | G06K 7/0008 340/572.1 |
| 2009/0159191 | A1* | 6/2009 | Grimes | G06K 17/0022 156/367 |
| 2013/0144991 | A1 | 6/2013 | Skalsky | 709/220 |
| 2016/0328637 | A1* | 11/2016 | Viikari | H04Q 9/00 |

OTHER PUBLICATIONS

The English translation of the International Preliminary Report on Patentability (Chapter I of the Patent Cooperation Treaty), dated Dec. 28, 2021, which was issued by the International Bureau of WIPO in Applicant's corresponding international PCT application having Serial No. PCT/EP2020/067840, filed on Jun. 25, 2020.

The Written Opinion of the International Searching Authority, in English, dated Sep. 24, 2020, which was issued by the International Bureau of WIPO in Applicant's corresponding international PCT application having Serial No. PCT/EP2020/067840, filed on Jun. 25, 2020.

The International Search Report, in English, dated Sep. 24, 2020, which was issued by the International Bureau of WIPO in Applicant's corresponding international PCT application having Serial No. PCT/EP2020/067840, filed on Jun. 25, 2020.

Wenyu Yang, et al., "*Wireless Firmware Execution Control In Computational RFID Systems*", 2015 IEEE International Conference on RFID (RFID), Apr. 15, 2015, pp. 129-136, XP032781655. Abstract and full text available at: https://ieeexplore.ieee.org/document/7113083 (last accessed on Jan. 8, 2024).

Yuanqing Zheng, et al., "*P-MTI: Physical-Layer Missing Tag Identification via Compressive Sensing*", IEEE/ACM Transactions on Networking, vol. 23, No. 4, Aug. 1, 2015, pp. 1356-1366, XP058072804. Abstract and full text available at: https://ieeexplore.ieee.org/document/6823747 (last accessed on Jan. 8, 2024).

Michael Buettner, et al., "*Dewdrop: An Energy-Aware Runtime For Computational RFID*" [PowerPoint slides], USENIX, USENIX, The Advanced Computing Systems Association, Feb. 25, 2019, XP061029216. Full text available at: https://www.usenix.org/legacy/events/nsdi11/tech/slides/buettner.pdf (last accessed on Jan. 8, 2024).

* cited by examiner

METHOD AND ASSEMBLY FOR WRITING SOFTWARE AND/OR FIRMWARE ONTO A PROGRAMMABLE INTEGRATED CIRCUIT

The invention relates to a method according to claim 1 for writing software and/or firmware onto a programmable integrated circuit, and an assembly according to claim 12 for wirelessly writing software and/or firmware onto at least one programmable integrated circuit.

Such writing of software and/or firmware onto a programmable integrated circuit is also referred to as "flashing". The programmable integrated circuit which is still unspecific until then or onto which new contents should be written, is set up and correspondingly programmed for later use by the flashing operation, i.e. by writing the software and/or firmware onto it. Such a programmable integrated circuit, for example, is a so-called MCU chip or an FPGA element. The invention that is explained in the following, however, is not restricted to MCU chips or FPGA chips, but is basically applicable to all types of programmable integrated circuits.

Hereinafter, integrated circuits for microcontroller units (MCUs) are understood to be an MCU chip. Such MCUs are designate in the state of the art as a one-chip computer system or as a "system on a chip" (SoC). For executing the respectively provided data processing operations, such units include software implemented during production, so-called firmware. In the course of the production of the MCU, such firmware is installed or written onto the integrated circuit of the MCU.

AN FPGA (field programmable gate array) is an integrated circuit of digital technology, into which a logic circuit can be loaded by means of programming.

In an FPGA element, such programming is understood to be the definition of a required circuit structure. This is formulated by means of a hardware description language. Producer software converts it into a configuration file. This file defines how the physical elements should be interconnected within the FPGA. That is why programming an FPGA is also referred to as the FPGA receiving a configuration.

Writing software and firmware onto the semiconductor structures of such circuits is referred to as "flashing". In the conventional state of the art, flashing is performed such that the MCU chip or the FPGA element is fixedly wired onto a circuit board. In a subsequent step, the circuit board is contacted to an external flashing device, for instance an external computer system. Via the circuit board, the provided software is then installed and written for the first time onto the MCU chip or the FPGA module.

Such a procedure is comparatively complex in terms of instrumentation and associated with a great number of working steps.

It is therefore a task to propose a method by means of which the writing of software, in particular firmware, into an MCU chip or an FPGA module may be performed at a minimized expenditure of time and expenditure of instrument engineering.

Hereby, it should be secured in particular, that the entire handling is accelerated throughout all of its single steps.

The task is solved by means of a method having the features of claim 1 for writing software and/or firmware onto at least one programmable integrated circuit, and an assembly having the features of claim 11 for wirelessly writing software and/or firmware onto at least one programmable integrated circuit. The subclaims include appropriate and/or advantageous embodiments of the method and/or the assembly.

The method for writing software and/or firmware onto at least one programmable integrated circuit is characterized according to the invention in that the writing of the software and/or firmware is performed wirelessly by means of RFID data transmission. The at least one programmable integrated circuit is coupled to an RFID front end via a wired near field interface, wherein the RFID front end has an RFID antenna device. In this case, the software and/or firmware to be written is sent wirelessly from an external RFID unit to the RFID antenna device and written onto the programmable integrated circuit via the RFID front end and the near field interface.

Appropriately, the wired near field interface has master functionality. This means that sending of data to the programmable integrated circuit will be executable in an active manner and without being requested to do so. This is advantageous, since due to the wireless response, access to the programmable integrated circuit is performed immediately.

The entire arrangement of the RFID front end, the near field interface and the programmable integrated circuit is operated in an appropriate configuration just like a passive RFID tag. In this case, the software and/or firmware to be written is transferred to the programmable integrated circuit by means of a conventional RFID write command or another command especially provided for that purpose. Consequently, RFID devices equipped in a standard manner and being available can be used for programming the circuit.

Advantageously, an electrical power supply for the integrated circuit is performed via the RFID front end at least during the writing process. Such an entire arrangement is electrically completely passive and does not need its own voltage source during the writing process.

In this case, the energy for the provided electrical power supply is withdrawn by transforming the field energy of an external RFID source. In an appropriate configuration, the field energy received from the RFID antenna device is converted via a fast rectifier circuit with subsequent smoothing and filtering as well as voltage regulation into electrical energy for the programmable integrated circuit.

However, it is also possible for the programmable integrated circuit to be supplied with electrical power via a battery unit and/or accumulator unit.

For programming a plurality of programmable integrated circuits, various configurations of the method are possible. In a first embodiment, the programmable integrated circuit, the RFID front end coupled via the wired near field interface, and the RFID antenna device included within the RFID front end, each are formed as a plurality of RFID transponder units arranged on a continuous web, wherein the continuous web is guided past an external RFID writing device for writing the software and/or firmware onto the programmable integrated circuit. It is understood that such a continuous web can be singularized after programming.

In a further embodiment, the programmable integrated circuit, the RFID front end coupled via the wired near field interface, and the RFID antenna device included within the RFID front end, each are formed as a plurality of individual transponder units or as RFID transponder units arranged on a common carrier, wherein the plurality of the RFID transponder units is brought commonly as a group into the area of the external writing unit and is programmed. Also, in this case, the common carrier can be singularized after programming.

The plurality of transponders can be moved into the reader field as a non-singularized entirety. They are simultaneously located in the reader field. Data is then exchanged between no more than one tag and one reader and thus is transferred sequentially. The programming process itself is thus not parallelized, but the handling that takes place around it, i.e. supplying and discharging the entirety, is parallelized.

In an advantageous configuration, a group write command is provided, due to which all of the RFID transponder units of the group located in the field of the external RFID writing device are caused to be simultaneously written upon and programmed. A special write command is established. This causes all of the transponders located within the field to simultaneously execute a special write command and thus to be written to simultaneously. The verification of the successful writing process may then be performed again sequentially.

In case of the parallelized programming, the external RFID writing device has a special geometry enabling exposing several transponder units to a sufficiently high field intensity. Parallelizing via several readers, however, is difficult with the otherwise usual geometry and the otherwise usual range so that corresponding constructional adaptations are necessary for this purpose.

As mentioned, the programmable integrated circuit may be an MCU chip or an FPGA chip.

An assembly for wirelessly writing software and/or firmware onto at least one programmable integrated circuit is composed of at least one RFID circuit that is arranged on a carrier and is addressable by an external RFID unit, and including the at least one programmable integrated circuit, a RFID front end with an RFID antenna, and a wired near field interface coupling the RFID front end to the programmable integrated circuit.

In an expedient variant, the RFID front end, the wired near field interface and the programmable integrated circuit are combined in a common integrated electronic component.

In one embodiment, the mentioned carrier is formed as a continuous web, wherein the continuous web has a plurality of RFID circuits, and the continuous web can be moved past an external RFID programming device, and each RFID circuit being addressable successively in this case. This means in particular that the carrier can have certain means and forms at its disposal by means of which a precise movement and positioning of the continuous web is possible with respect to an external RFID device.

The carrier may also have a plurality of RFID circuits, wherein the RFID circuits arranged on the carrier are addressable by an external RFID device in an individually addressable manner. In such a case, the individual programming of the programmable integrated circuits is not caused by moving the corresponding carrier portion past the RFID device and positioning it, rather the carrier can be inserted as a whole into an RFID device, wherein each individual programmable integrated circuit is then addressed, for example, via a certain command, but all of the circuits otherwise are always located commonly within the RFID-sensitive area of the RFID device.

Of course, it is also possible for the carrier as an individual useful panel having only one RFID circuit formed. In such a case, the RFID circuit arranged on the carrier is addressable by a mobile RFID programming device or is addressable by an external RFID device in an addressable manner. Such a configuration is particularly suitable for itinerantly retrofitting or newly programming circuits in the course of a customer service or also for programming larger quantities of irregularly arranged carriers, the circuits of which as such each being different from one another but can be programmed in a single RFID device due to this configuration, but wherein a cumbersome successively programming of the individual useful panels can be omitted.

The method and the assembly for executing the method according to the invention will be explained hereinafter in more detail on the basis of exemplary embodiments. FIGS. 1 to 8 serve the purpose of clarification. The same numerals will be used for identical or identically acting parts. Shown are in:

Figure 1:
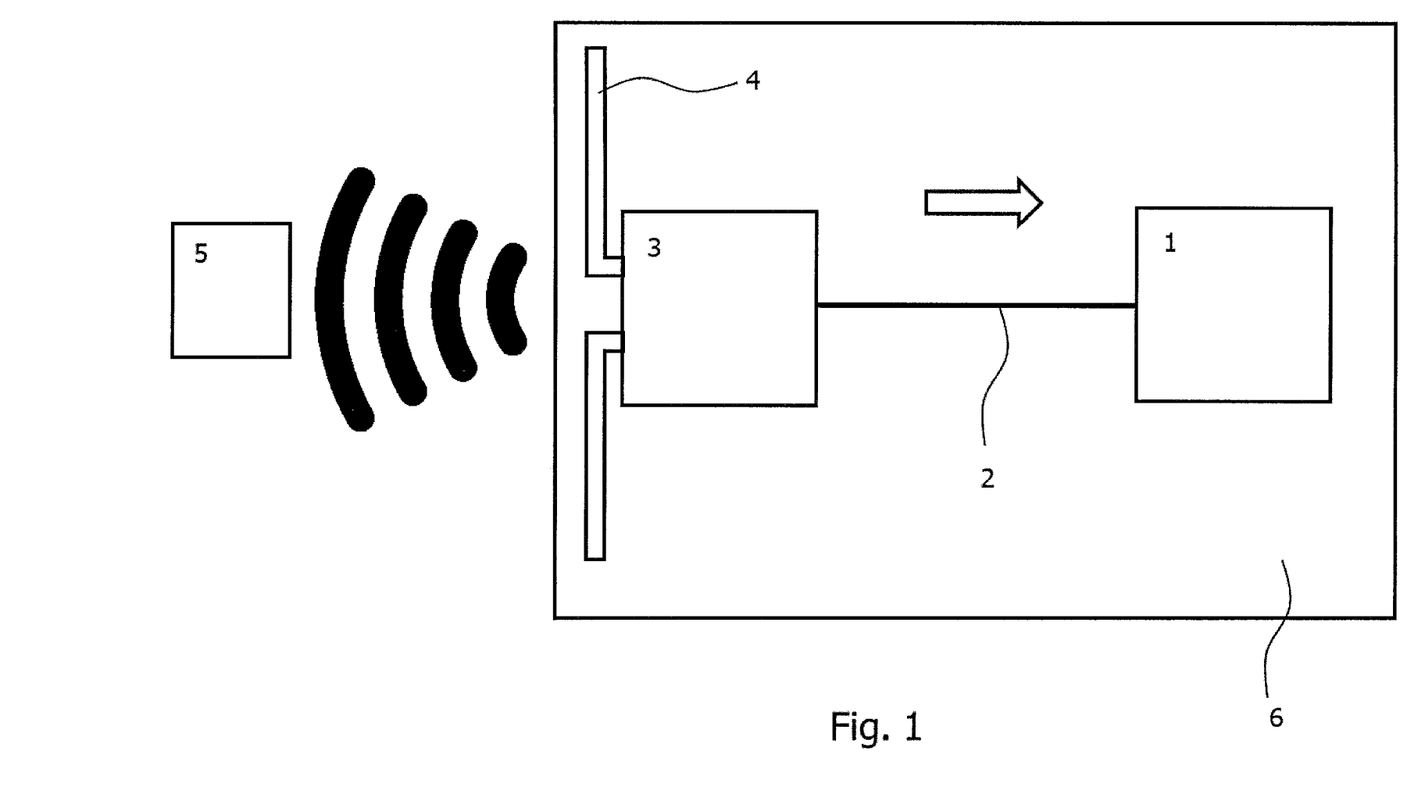
FIG. 1 a basic construction of an assembly for flashing a programmable integrated circuit in a first embodiment, FIG. 2 a basic construction of an assembly for flashing a programmable integrated circuit in a second embodiment, wherein the RFID front end having the programmable integrated circuit is combined in an individual integrated circuit, FIG. 3 an exemplary realization of an assembly using a JTAG interface, an RFID front end and an MCU or an FPGA, FIG. 4 an exemplary realization of an assembly, in which the RFID front end, a program memory and the JTAG interface are combined within an MCU or FPGA, FIG. 5 an exemplary embodiment, in which the electrical power supply of the programmable integrated circuit is performed via the RFID antenna device, FIG. 6 an exemplary embodiment, in which the electrical power supply of the programmable integrated circuit is performed via a battery device arranged on a common carrier, FIG. 7 an exemplary continuous web having a plurality of individual RFID circuits, FIG. 8 an exemplary arrangement of a group of RFID circuits having individual addressability.

FIG. 1 shows a basic construction of an assembly for flashing a programmable integrated circuit 1 in a first embodiment. The programmable integrated circuit 1 is coupled to an RFID front end 3 via a wired near field interface 2. The RFID front end 3 has an RFID antenna 4 which can communicate with an external RFID device 5, i.e. can receive data from there or send data to the external RFID device. The entire assembly of RFID front end having the RFID antenna, the wired near field interface, and the programmable integrated circuit is arranged on a carrier 6. The entire construction can thus be handled as an RFID tag or be influenced by the external RFID device.

The wired near field interface is formed as a master interface. This means, that this interface transmits data from the RFID front end 3 to the programmable integrated circuit 1, in particular without being requested to do so. Ultimately, this enables software and/or firmware from the external RFID device to be written onto the programmable integrated circuit 1 via the RFID front end 3. The entire assembly has the effect of an RFID tag towards the exterior.

The wired near field interface is implemented in hardware structures within the RFID front end 3 and/or in hardware structures of the programmable integrated circuit 1.

Figure 2:
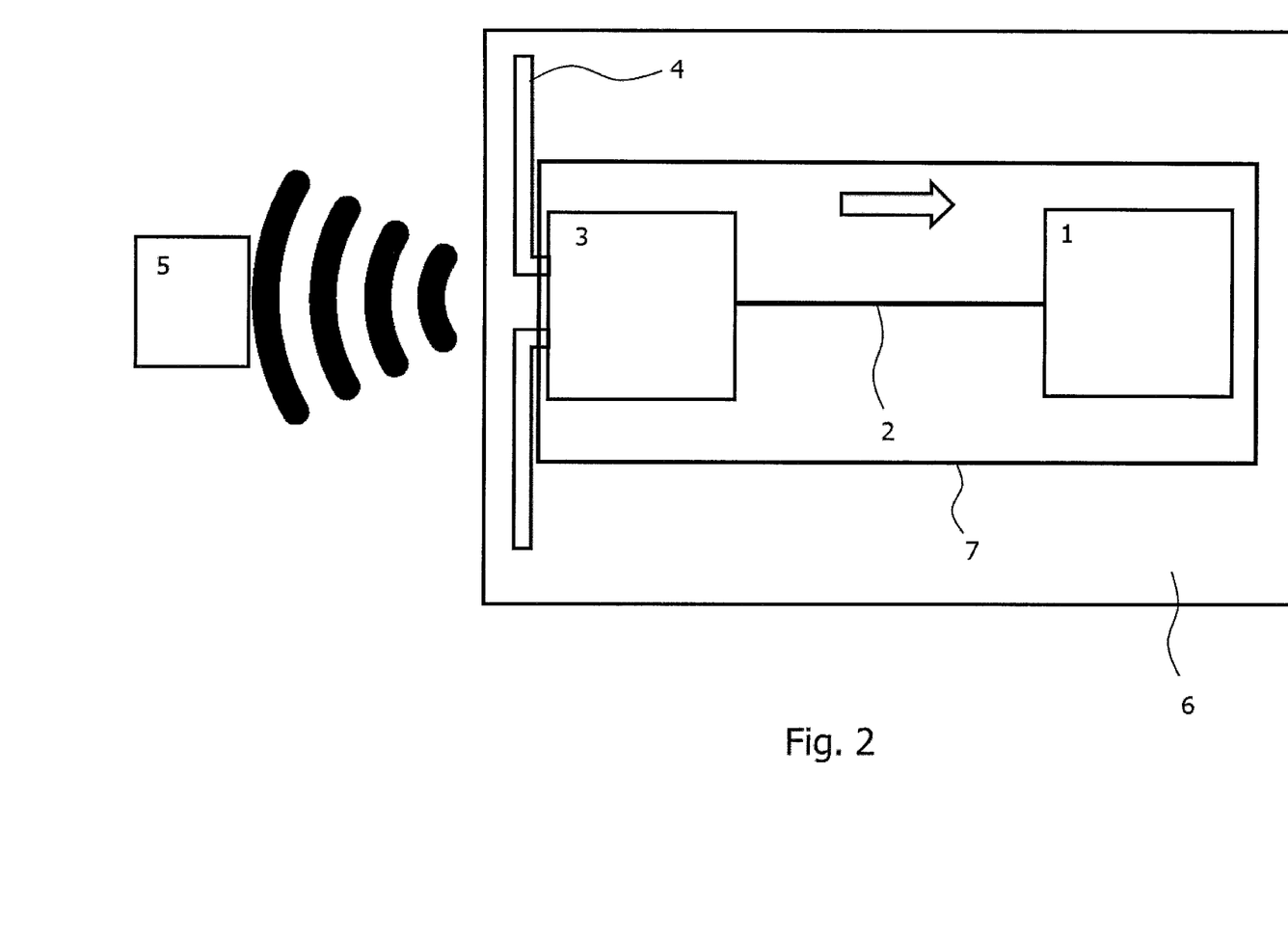

In the assembly according to FIG. 2, basically the same construction is realized. In the exemplary embodiment shown here, however, the RFID front end 3 together with the programmable integrated circuit 1 and the wired near field interface 2 are combined in a common integrated electronic component 7, i.e. in particular within a common chip. The arrangement present on the carrier 6 in the external appearance then practically only shows the RFID antenna device 4 and the common integrated electronic component 7, i.e. the common chip, and thus appears like a conventional RFID tag. This RFID tag, however, is programmable.

Figure 3:
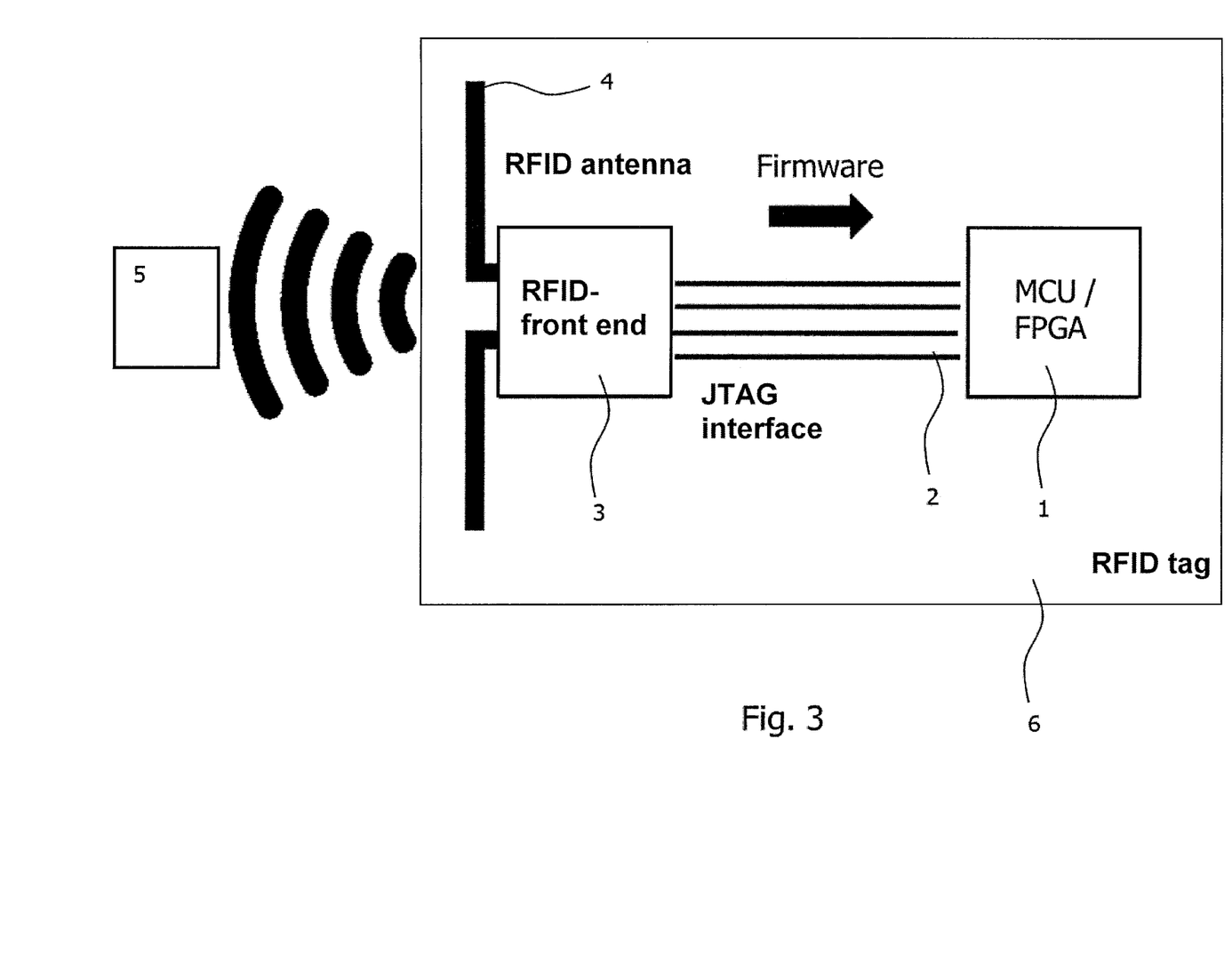
Figure 4:
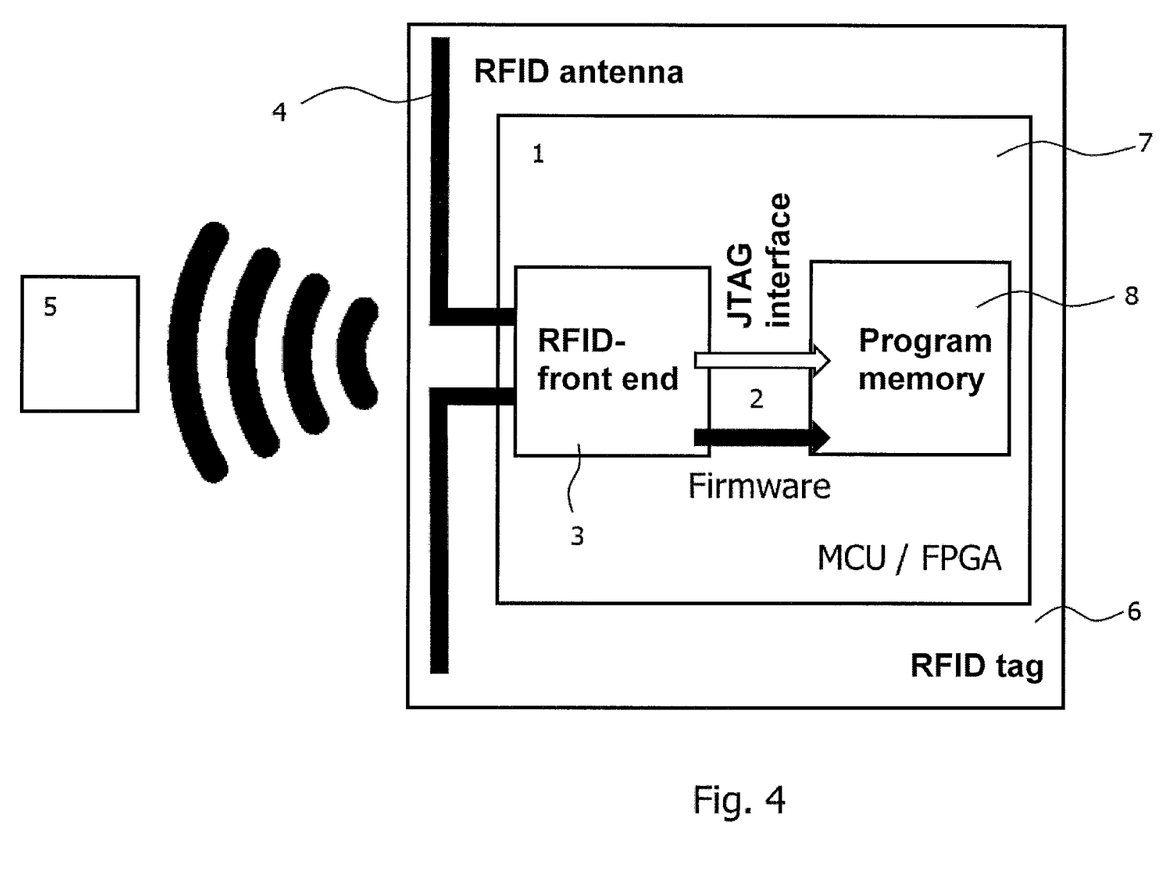

FIGS. 3 and 4 show exemplary realizations of an assembly using a JTAG interface as the wired near field interface 2, the RFID front end 3 and an MCU and/or an FPGA as the programmable integrated circuit 1. In the embodiment according to FIG. 4, the RFID front end 3, a program memory 8, and the JTAG interface as the near field interface 2 are combined within the MCU or FPGA as the programmable integrated circuit 1. This circuit thus forms the common integrated electronic component 7 in this example.

In summary, the RFID front end 3 thus can be realized as an independent IC applied to a circuit board or a similar substrate, or may alternatively be integrated into the common integrated electronic component 7. As the near field interface between the RFID front end and the programmable integrated circuit 1, various wired near field interfaces such as JTAG, Spy-Bi-Wire, UART, SPI, 12C can be used, for example.

The assemblies according to the exemplary embodiments in FIGS. 1 to 4 enable flashing in particular from programmable MCUs or FPGAs to be performed wirelessly and in a contactless manner while using RFID technology (in the style and expansion of a functionality according to ISO 18000-6C). The external RFID device 5 serves the purpose of a flashing unit. The coupling between the flashing unit and the MCU or the FPGA component is in this case performed via an air interface between two antennas. A first antenna is in this case a component of the RFID technology of the external flashing unit, whereas a second antenna as the mentioned RFID antenna device 4 is coupled to the MCU chip or the FPGA element.

The RFID front end which is either separate or integrated into the MCU or the FPGA enables data exchange, i.e. communication between the MCU chip or the FPGA element and the RFID reader of the external flashing unit.

The RFID front end is either an integral component of the MCU chip or the FPGA. Apart from FIG. 2, such a configuration is also depicted in FIG. 4. The RFID front end, however, may also be assigned to the MCU chip or the FPGA as an additional hardware component on a common substrate as shown in FIG. 3 or also in FIG. 1. The MCU or the FPGA thus has an RFID front end at its disposal or is connected to an RFID-compatible component transferring the data to the MCU or the FPGA.

The RFID front end and the MCU chip or the FPGA communicate with one another via a corresponding interface. In particular, a so-called JTAG interface is used here.

With respect to external devices, i.e. in particular with respect to the external flashing unit, the entirety of MCU chip or FPGA and RFID front end, including the RFID antenna, functions like a conventional RFID tag. This means in particular that this tag responds to RFID reader commands and moreover interacts with them.

The MCU chip, the FPGA, or the MCU chip, the FPGA and the RFID front end thereof are coupled and tuned to a suitable RFID tag antenna for this purpose. The tuning is in particular related to the sensitivity and power consumption of the RFID tag antenna.

In the method according to the invention for flashing the MCU chip or the FPGA, the software to be programmed, i.e. in particular the firmware to be programmed, is transmitted wirelessly to the RFID tag including the MCU chip or the FPGA contained therein via an RFID write command and/or a comparable control command by means of the RFID reader of the external flashing unit.

Writing the firmware onto the MCU chip or the FPGA is then performed in the usual manner known as such. The firmware transmitted via the RFID is written into the program memory of the MCU chip or the corresponding structures of the FPGA provided for this purpose.

This can also be realized such that a special independent RFID command is required for this purpose, so that the data is first written into a special memory area of the RFID tag, and only is shifted into the program memory of the MCU chip or the circuit structures of the FPGA thereafter.

The described method may also be used in various manufacturing processes.

Various embodiments may be used to provide electrical power to the programmable integrated circuit 1, i.e. of the MCU or the FPGA.

Figure 5:
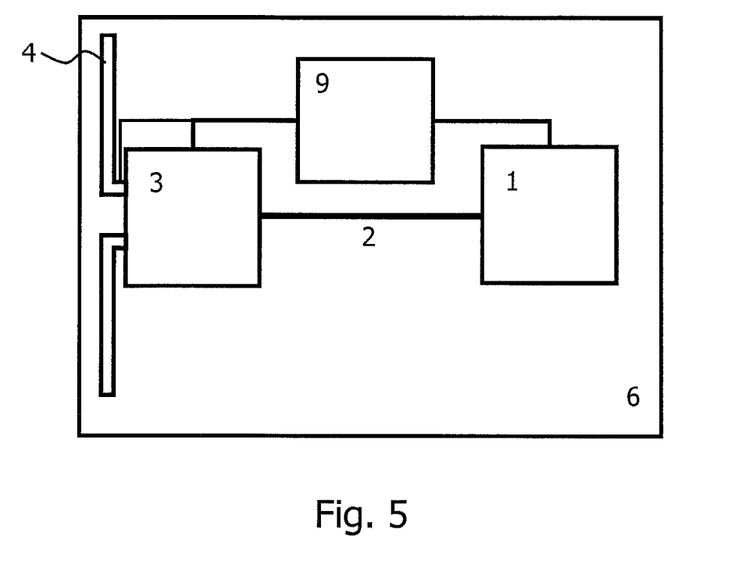

FIG. 5 shows an embodiment in which the RFID front end 3 provides the integrated circuit 1 to be programmed with a power supply during the programming process. In this case, energy is withdrawn from the electromagnetic reading field of the RFID reading/writing device, which energy is used during the programming process to supply the programmable circuit 1 with sufficient power. Such a power supply accordingly is composed of a fast rectifier circuit 9 connected to the RFID antenna device 4 and performing in addition, after rectifying and subsequently smoothing and filtering the pulsating direct voltage, a regulation of the generated fluctuating direct voltage to fixed voltage values. Of course, the fast rectifier circuit 9 may also be connected to the RFID front end 3.

Figure 6:
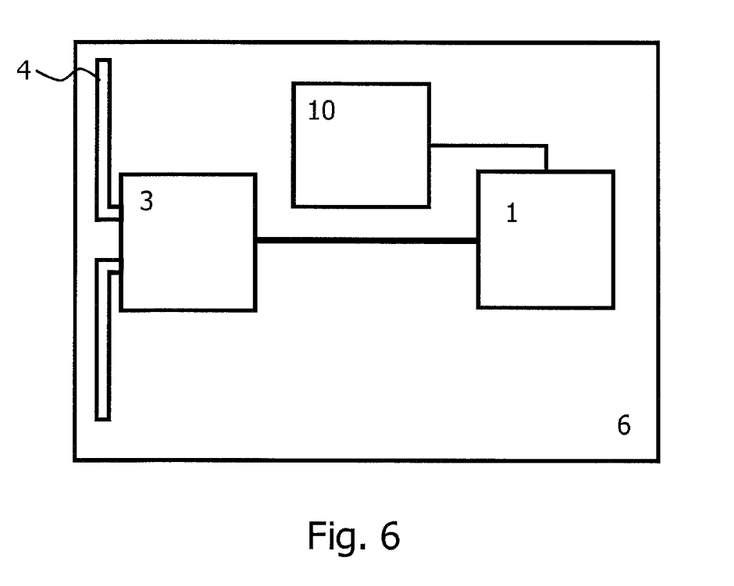

In alternative to such a power supply taking place from the electromagnetic alternating field, a battery or an accumulator 10 may also be employed according to FIG. 6.

The programming method which is possible by means of such RFID tags may be applied for wirelessly programming MCU chips or FPGAs during the production process of RFID tags equipped with MCU chips or FPGAs. Hereby, an electrical contacting which is difficult under production conditions and ultimately is completely disadvantageous for the RFID tag can be avoided.

Figure 7:
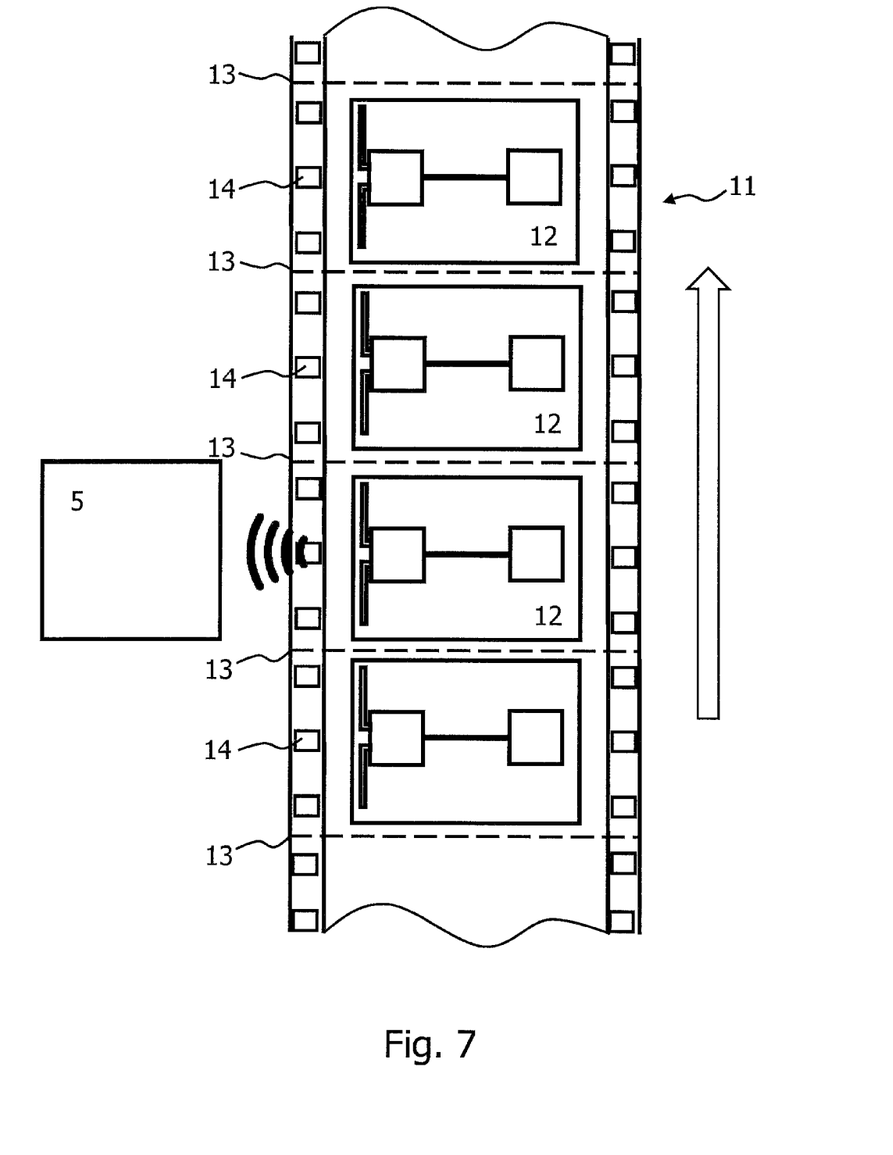

FIG. 7 shows an exemplary continuous web having a plurality of individual RFID circuits. Such a configuration can be applied in a roll-to-roll manufacturing method.

FIG. 7 shows a continuous web 11 including a plurality of RFID transponder units 12. Each of these transponder units 12 includes the above explained assembly of the programmable integrated circuit 1, the wired near field interface 2, the RFID front end 3 having the RFID antenna device 4. The continuous web 11 is singularized in a later process step into individual RFID tags. Together with the transponder units, the continuous web thus forms a transponder web.

In the combination of the flash method according to the invention with the roll-to-roll manufacture, the transponder web as an continuous web is continuously moved or passed by in a clocked manner during the production. In this case, the RFID elements and the integrated circuits of the transponder units 12 are printed onto the corresponding substrate at a production station, while, at a further production station, the integrated programmable circuit, i.e. in particular the MCU chip or the FPGA, together with the RFID front end either integrated in the MCU chip or the FPGA or is additional, are deposited on the substrate and contacted with the printed RFID antenna. Of course, further production stations can be provided here, such as a coating with an adhesive layer, a top layer and more manufacturing steps like that.

The entire continuous web 11 is continuously moved further, wherein the finished RFID elements are finally supplied to the external RFID device 5 as a flashing unit, which then performs the writing of the firmware onto the MCU chip or the FPGA via the wireless and contactless data exchange at each individual RFID element. Thereafter or else before writing down the firmware, the singularization of the RFID elements is then performed along separating lines 13 on the continuous web provided for that purpose. These separating lines may be provided as target separating lines, such as in the form of perforation lines or yield lines stamped in. But they may also define the imaginary line stored in advance in a manufacturing system, along which the individual elements are cut off and singularized in a defined manner.

It is understood that instead of the previously mentioned firmware, miscellaneous software of all kinds may be correspondingly written onto the MCU chip or the FPGA. This relates in particular to the programming of the MCU or the FPGA with control software or a comparable implementable code.

An RFID air interface is thus created, which is potentially directly programmable in the component manufacture. Consequently, no conventional writing or evaluating of an RFID chip is executed, but an RFID interface (RFID front end) is used for communicating with an MCU or an FPGA.

For example, this is done specifically such that the MCU or the FPGA having an integrated or separate RFID front end is mounted on the continuous web 11, which is configured as an inlay web. In a roll-to-roll process, the inlay web is processed into the transponder web by adding diverse covers or, where appropriate, also intermediate layers. The inlay web is composed of an endless material (e.g. a PET film, a PI film or other suitable substrates) on a roll, onto which individual conductive structures, usually of the same layout, are applied (e.g. printed, etched, milled) in a row.

These structures of the same layout are composed of at least one RFID antenna, at least one MCU or FPGA, and, where appropriate, still further components such as sensors, batteries or diverse electronic components. The manufacturing process takes place at a constant feed rate or at short cycle times. Thus, conventional electrically contacting for programming is not possible or only with considerable difficulty.

Wirelessly programming via the RFID interface, however, may also take place during a transponder web being moved. The web is in this case guided past a reader antenna in a defined and reproducible manner. The reader is in this case triggered, for example, via a light barrier control. For this purpose, the continuous web 11 as a supplement may have a series of holes 14 which, on the one hand, support the transport of the continuous web in functional connection with guiding and conveying devices but, on the other hand, are registered also by the light barrier control as pinhole apertures and thus as position markings. The RFID transponder units 12 can then be recognized in the optimum position with respect to the external RFID device 5 and thus to the RFID flash unit so that the flash process itself can proceed without problems.

Figure 8:
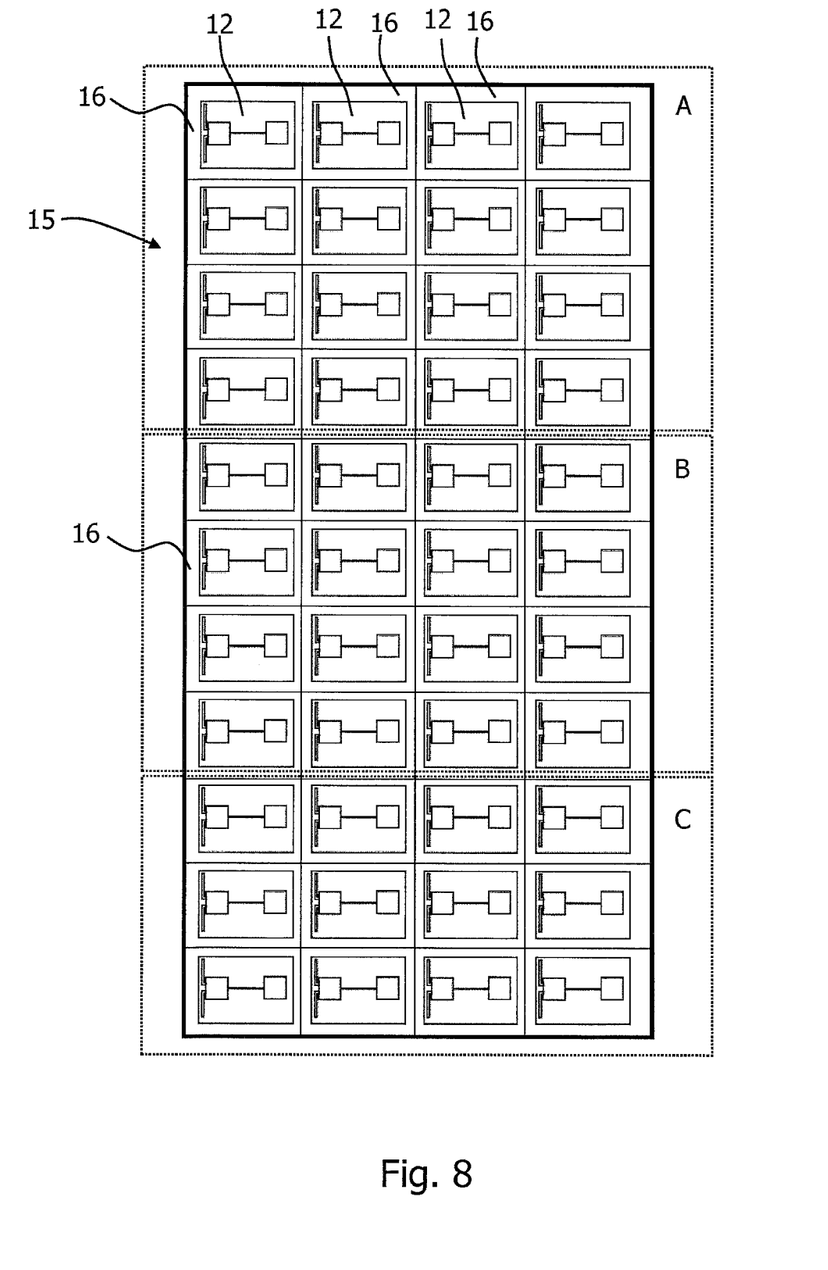

FIG. 8 shows an exemplary assembly of a group of RFID circuits having individual addressability. Such a configuration is advantageous for enabling wireless programming in a so-called group. In group programming, several RFID transponder units 12, i.e. several programmable integrated circuits included therein, are wirelessly programmed via the RFID access simultaneously. Here, establishing a special write command is advantageous, which causes writing to be performed on all RFID transponder units simultaneously within the group.

A plurality of MCUs or FPGAs having an integrated or separate front end, i.e. a plurality of RFID transponder units 12, is in this case mounted on a rigid or flexible circuit board panel 15, for example. The circuit board panel 15 is composed of several identical or even different single circuit boards 16. Where appropriate, the single circuit boards 16 moreover have covers (e.g. processed into so-called RFID labels or RFID tags) added on one side or both sides. "Cover" may also mean an installation in a housing (e.g. so-called RFID hard tag).

Programming is performed in this case appropriately within the panel as group programming so as not to be required to separately address and program the RFID transponder units 12 on each single circuit board 16. Thereby, an enormous labour saving is achieved. In contrast to the previous exemplary embodiment, where each transponder on the continuous web is individually programmed, the group programming performs the programming in an addressed manner. This means that the above-mentioned write command firstly activates simultaneous writing in the RFID transponder units, while addressing, however, only addresses single RFID transponder units or a subset of RFID transponder units so that individual data is selectively transmitted here.

After a first starting scan when the recognition of the useful panel is started, the number of the recognized single circuit boards as well as their addresses/TIDs are detected and subsequently processed sequentially. In the case of group programming, this is performed such that, for example, first a section A as a whole and subsequently a section B or a section C of the circuit board panel 15 is subjected to an external RFID field for programming. A simultaneous processing of all of the three sections is also possible in case of large external RFID fields, wherein the addressing is used here.

It is likewise possible for the individual programmable integrated circuits to be already configured individually addressable, i.e. in the scope of a certain hardware configuration or a previous programming. In group programming, individual programming sequences are sent, wherein each individual sequence is tuned to the certain individual addressability of the individual programmable circuits. The useful circuit board panel 15 is thus acted upon as a whole by the RFID field, the individual sequences, however, only address certain addressed RFID transponder units or their integrated individual circuits, and programming thus is indeed performed synchronously in the group, where appropriate, but ultimately in an individually different manner.

Individual programming after production is also possible. The MCU or FPGA having a separate or integrated RFID front end is seated on a rigid or flexible circuit board. Where appropriate, covers are once more added to the circuit board on one side or both sides (e.g. processed into so-called RFID labels or RFID tags), wherein cover may also mean the installation in a housing (e.g. the so-called RFID hard tag). At the time of producing the RFID labels/RFID hard tags, their later use does not yet need to be defined. So to say, universal transponders are manufactured first. Since a later wired programming is not possible or not advantageous, programming is carried out via the RFID interface. This can take place in the course of an inspection of outgoing merchandise. The transponder to be tested is placed upon the inspection station, is programmed, is measured (check of the RFID performance) and is tested (reading of the measurement data or similar).

Individual programming by means of a firmware update after delivery is also possible as part of maintenance, a firmware update or such actions on site. The MCU or FPGA having a separate or integrated RFID front end is seated on a rigid or flexible circuit board. Where appropriate, covers are added to the circuit board on one side or both sides (e.g. so-called RFID labels or RFID tags), wherein cover may also mean the installation in a housing (e.g. the so-called RFID hard tag).

The programmed firmware, for example, is current at the time of production of the RFID transponders, and the RFID transponders have already been delivered to the customer. In the course of time, however, the firmware, has improved or evolved. Since a subsequent wired firmware update is not possible, only programming via the RFID interface may be carried out. This may take place directly at the customer's place. The RFID transponder to be updated is written onto and tested by means of a special RFID programming device. For this purpose, measurement data is read out or a similar testing operation is performed.

The subject matters of the invention have been explained by way of example. Within the scope of expertise action, further configurations are possible. Further embodiments will moreover result from the subclaims.

LIST OF REFERENCE NUMERALS 1 programmable integrated circuit
2 wired near field interface
3 RFID front end
4 RFID antenna
5 external RFID device
6 carrier
7 integrated electronic component
8 program memory
9 fast rectifier circuit
10 battery or accumulator
11 continuous web
12 transponder unit
13 separating line
14 hole
15 useful circuit board panel
16 single circuits board
A, B, C sections of the useful circuit board panel

The invention claimed is:

1. A method for writing software and/or firmware onto at least one programmable integrated circuit (1), characterized in that
the programmable integrated circuit (1) is an MCU chip or an FPGA chip,
the writing of the software and/or firmware as flashing the programmable MCU or FPGA is performed wirelessly by means of RFID data transmission, wherein
the at least one programmable integrated circuit (1) is coupled to an RFID front end (3) via a wired near field interface (2), wherein the RFID front end (3) has an RFID antenna device (4), and wherein the software and/or firmware to be written is sent wirelessly from an external RFID unit to the RFID antenna device and is written onto the programmable integrated circuit (1) via the RFID front end (3) and the near field interface (2), wherein
the at least one programmable integrated circuit (1), the near field interface (2) for writing software and/or firmware onto the programmable integrated circuit, the RFID front end (3) and the antenna (4) are arranged as an entire assembly on a common carrier (6),
wherein the wired near field interface is implemented in hardware structures within the RFID front end (3) and/or in hardware structures of the programmable integrated circuit (1), and wherein the wired near field interface (2) has master functionality, in which sending of data to the programmable integrated circuit (1) is executable in an active manner and without being requested to do so.

2. The method according to claim 1,
characterized in that
the entire arrangement of the RFID front end (3), the near field interface (2) and the programmable integrated circuit (1) is operated as a passive RFID tag, wherein the software and/or firmware to be written is transferred to the programmable integrated circuit (1) by means of a conventional RFID write command and/or a comparable command.

3. The method according to claim 1,
characterized in that,
at least during the writing process of the software and/or firmware, an electrical power supply for the programmable integrated circuit (1) is performed.

4. The method according to claim 3,
characterized in that
the energy for the provided electrical power supply is withdrawn by transforming the field energy of an external RFID source.

5. The method according to claim 4,
characterized in that
the field energy received from the RFID antenna device (4) is converted via a fast rectifier circuit (9) with smoothing and filtering as well as voltage regulation into electrical energy for the programmable integrated circuit (1).

6. The method according to claim 1,
characterized in that
the programmable integrated circuit (1) is supplied with electrical power via a battery unit and/or accumulator unit (10).

7. The method according to claim 1,
characterized in that
the programmable integrated circuit (1), the RFID front end (3) coupled via the wired near field interface (2), and the RFID antenna device (4) included within the RFID front end, each are formed as a plurality of RFID transponder units arranged on a continuous web, wherein the continuous web is guided past an external RFID writing device for writing the software and/or firmware onto the programmable integrated circuit.

8. The method according to claim 1,
characterized in that
the programmable integrated circuit (1), the RFID front end (3) coupled via the wired near field interface (2), and the RFID antenna device (4) included within the RFID front end, each are formed as a plurality of individual transponder units or as RFID transponder units arranged on a common carrier, wherein the plurality of the RFID transponder units is brought commonly as a group into the area of the external writing unit and is programmed.

9. The method according to claim 8,
characterized in that
a group write command is provided, due to which all of the RFID transponder units of the group located in the field of the external RFID writing device are caused to be simultaneously written upon and programmed.

10. An assembly for wirelessly writing software and/or firmware onto at least one programmable integrated circuit, composed of at least one RFID circuit that is arranged on a common carrier (6) and is addressable by an external RFID unit, and including the at least one programmable integrated circuit (1), an RFID front end (3) with an RFID antenna (4), and a wired near field interface (2) coupling the RFID front end to the programmable integrated circuit wherein the programmable integrated circuit (1) is an MCU chip or an FPGA chip, the writing of the software and/or firmware as flashing the programmable MCU or FPGA is performed wirelessly by means of RFID data transmission, wherein the at least one programmable integrated circuit (1), the near field interface (2) for writing software and/or firmware onto the programmable integrated circuit, the RFID front end (3) and the antenna (4) are arranged as an entire assembly on the common carrier (6), wherein the wired near field interface is implemented in hardware structures within the RFID front end (3) and/or in hardware structures of the programmable integrated circuit (1), and wherein the wired near field interface (2) has master functionality, in which sending of data to the programmable integrated circuit (1) is executable in an active manner and without being requested to do so.

11. The assembly according to claim 10,
characterized in that
the RFID front end (3), the wired near field interface (2) and the programmable integrated circuit (1) are combined in a common integrated electronic component (7).

12. The assembly according to claim 10,
characterized in that
the carrier (6) is formed as a continuous web, wherein the continuous web has a plurality of RFID circuits, and the continuous web is movable past an external programming device, and each RFID circuit being addressable successively in this case.

13. The assembly according to claim 10,
characterized in that
the carrier (6) has a plurality of RFID circuits (12), wherein the RFID circuits (12) arranged on the carrier are addressable by an external RFID device (5) in an individually addressable manner.

14. The assembly according to claim 10,
characterized in that
the carrier (6) as an individual useful panel has only one RFID circuit (12) formed, wherein the RFID circuit (12) arranged on the carrier is addressable by a mobile RFID programming device or is addressable by an external RFID device in an addressable manner.

15. A method for writing software and/or firmware onto at least one programmable integrated circuit (1),
characterized in that
the writing of the software and/or firmware is performed wirelessly by means of RFID data transmission, wherein the at least one programmable integrated circuit (1) is coupled to an RFID front end (3) via a wired near field interface (2), wherein the RFID front end (3) has an RFID antenna device (4), and wherein the software and/or firmware to be written is sent wirelessly from an external RFID unit to the RFID antenna device and is written onto the programmable integrated circuit (1) via the RFID front end (3) and the near field interface (2), and wherein the programmable integrated circuit (1), the RFID front end (3) coupled via the wired near field interface (2), and the RFID antenna device (4) included within the RFID front end, each are formed as a plurality of individual transponder units or as RFID transponder units arranged on a common carrier, wherein the plurality of the RFID transponder units is brought commonly as a group into the area of the external writing unit and is programmed.

16. The method according to claim 15,
characterized in that
a group write command is provided, due to which all of the RFID transponder units of the group located in the field of the external RFID writing device are caused to be simultaneously written upon and programmed.

* * * * *